3,166,917
ABSORBER-EVAPORATOR UNIT FOR AN ABSORPTION-REFRIGERATION SYSTEM
Robert J. Hallatt, Tulsa, Okla.; Charles A. Whitebook, executor of said Robert J. Hallatt, deceased, assignor to Robert L. Rorschach, Tulsa, Okla.
Filed May 16, 1962, Ser. No. 195,188
2 Claims. (Cl. 62—496)

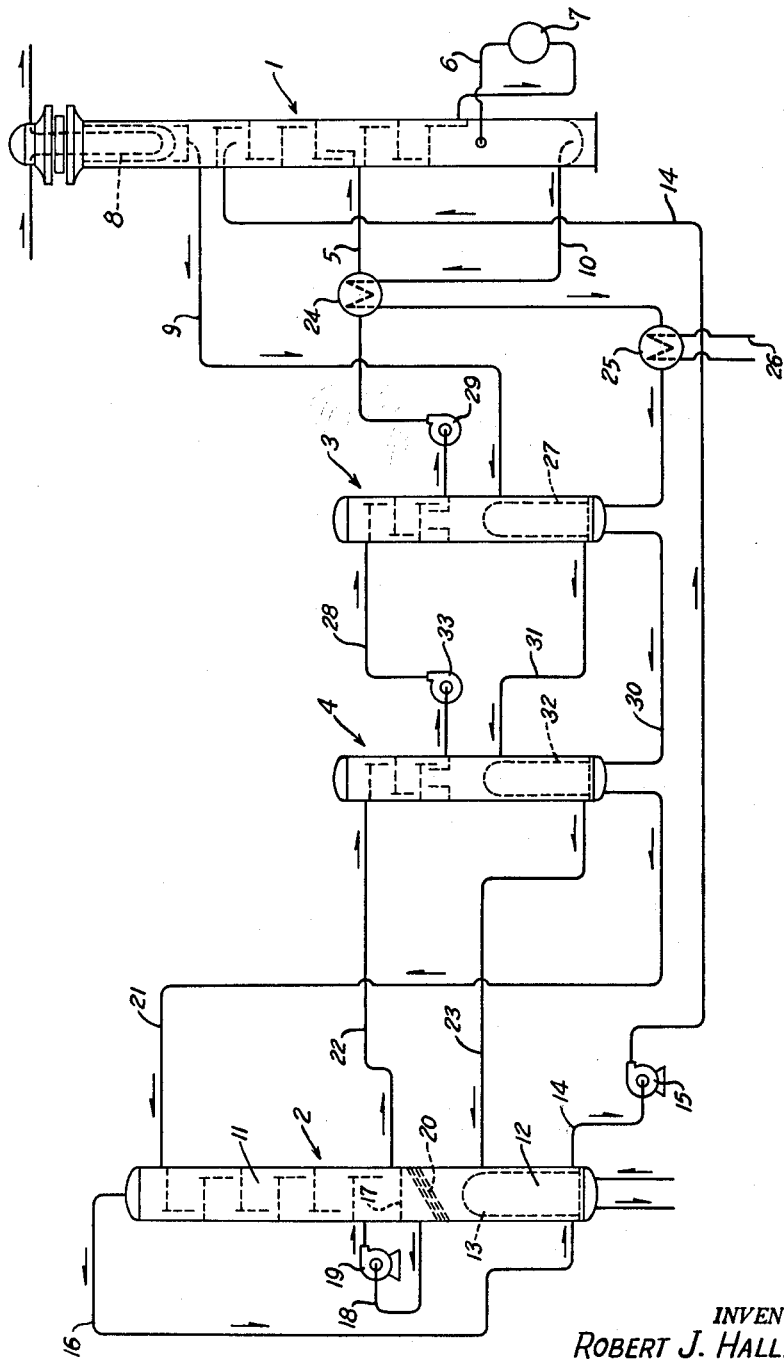

This invention relates to a process of absorption and more particularly to an absorption-refrigeration process having an improved absorber-evaporator design.

In the conventional absorption process, the inert gas is drawn off the top of the absorber unit and conducted through a line to the bottom portion of the evaporator. A blower or fluid moving device is positioned in the conduit and serves to move the inert gas from the absorber to the evaporator. One of the problems in an inert gas absorption system such as this is that the presence of the inert gas in the absorber lessens the ability of the absorbent to absorb refrigerant vapors. Therefore a greater quantity of absorbent must be circulated through the absorber to dissolve a given amount of refrigerant vapor if inert gas is present, and thus the efficiency of an absorption-refrigeration cycle operating at fixed temperature levels is largely a function of the absorbent circulation rate.

The present invention is directed to a low temperature absorption-refrigeration system having improved efficiency which is brought about by the use of a novel absorber-evaporator unit in the system. According to the invention, a conduit is connected between the upper portion of the absorber and the lower portion of the evaporator and serves to conduct the inert gas from the absorber to the evaporator. In addition, a second conduit is employed which connects the upper portion of the evaporator to the lower portion of the absorber and a blower is positioned in the second conduit and serves to circulate the inert gas through the closed system. By positioning the blower between the evaporator and the absorber, the pressure in the evaporator is maintained at a minimum so that the working temperature is as low as possible. The blower develops a small head of pressure and by locating the blower between the evaporator and the absorber, this pressure head is added to the pressure in the absorber which improves the efficiency and maintains the pressure in the evaporator at a minimum level.

In addition, the medium to be cooled by the refrigerant is circulated through a heat exchanger such as a tube bundle which is inserted within the evaporator. By positioning the heat exchanger within the evaporator, the latent heat of vaporization of the liquid refrigerant is employed to cool the outside medium.

The present absorption system eliminates the need for low temperature mechanical refrigeration equipment which is difficult to operate with a high degree of continuity and also lowers the labor cost since operator attendance is not required with the absorption system. Furthermore, the absorption system is capable of using low level waste heat where it is available as a cheap source of energy to operate the system.

There is very little wear of the absorption equipment, for there are few rotating parts and as corrosion is absent, maintenance and component replacement costs are negligible.

The low temperatures can be obtained with the present system without cascade or multi-stage systems. For example, the process can easily withdraw heat at 150° F. to reject at atmospheric temperature in one stage.

Other objects and advantages will appear in the course of the following description.

The drawing furnished herewith illustrates the best mode presently contemplated of carrying out the invention.

The drawing is a flow sheet showing the absorption process of the invention.

The drawing illustrates an absorption-refrigeration system and includes generally a fractionator or generator 1, an evaporator-absorber unit 2, and a pair of absorber-exchanger units 3 and 4.

The fractionator 1 is of conventional design and is essentially a pressurized tower where the enriched absorbent is heated to volatilize and separate the refrigerant vapor from the absorbent. The refrigerant to be used in the system may be any low boiling point liquid such as methane, ethane, propane, Freon, ammonia and the like which is capable of being absorbed in the liquid absorbent. The absorbent may take the form of hexane, pentane, water and the like.

The heat-exchanged, enriched absorbent is introduced into the central portion of the fractionator through line 5 and flashes, the liquid passing downwardly within the fractionator in counter current flow with the vapor moving upwardly within the tower. The bottom liquid is heated by circulating all or part of the liquid through line 6 in contact with a heat source 7. Reboiling of the fractionator can be done in any convenient manner such as direct gas-fired heating, steam, electric heating and the like. Heating of the bottom liquid causes the refrigerant to volatilize and the refrigerant vapor passes upwardly within the fractionator and into contact with a tube bundle 8 containing a cooling medium to thereby condense the refrigerant vapor. A portion of the condensed refrigerant is collected and withdrawn from the fractionator through line 9, while a second portion of the condensed refrigerant flows downwardly within the fractionator which is thus refluxed. The pure absorbent is collected in the bottom of the fractionator.

The pure absorbent is withdrawn from the fractionator through line 10 and is subsequently introduced into the absorber section 11 of the absorber-evaporator unit 2, while the pure refrigerant withdrawn through line 9 is subsequently introduced into the lower evaporator section 12 of the absorber-evaporator unit.

A portion of the refrigerant liquid is evporated in contact with an inert gas in the evaporator 12 and the cold liquid refrigerant is disposed in heat transfer relation with a fluid to be chilled which is flowing through the tube bundle 13 located within the bottom portion of the evaporator. The tube bundle 13 can be any conventional type of heat exchanging unit which contains the medium to be chilled or cooled. The entire heat exchange unit or tube bundle 13 is removable from the evaporator for maintenance and repair. As the medium to be chilled is in heat conductive relation with the vaporizing refrigerant, the latent heat of vaporization is also employed to cool the medium flowing within the tube bundle 13.

The cold liquid refrigerant is withdrawn from the lower end of the evaporator and is circulated through line 14 by pump 15 to the upper end portion of the fractionator 1.

In order to reduce the partial vapor pressure of the refrigerant within the evaporator 12 and to cause the refrigerant to boil at a lower temperature, an inert gas such as helium, hydrogen, nitrogen or the like is circulated through the evaporator and absorber. A conduit 16 connects the upper portion of the absorber with the lower portion of the evaporator and serves to circulate the inert gas from the absorber to the evaporator. While the absorber is located above the evaporator, there is no direct communication between the absorber section 11 and the evaporator section 12 and the units are separated by a plate 17. The inert gas is conducted from the upper end of the evaporator 12 through a conduit 18 to the lower end of the absorber 11 and a blower 19 is positioned within the conduit 18 and serves to circulate the inert gas through the closed system which comprises the absorber 11, conduit 16, evaporator 12 and conduit 18.

The inert gas serves to reduce the partial vapor pressure of the refrigerant causing it to boil at a lower temperature with the resulting heat of vaporization capacity for absorbing heat occurring at a lower temperature. This results in the liquid refrigerant being withdrawn from the bottom of the evaporator at a lower temperature. The use of the conduit 18 and the blower 19 increases the efficiency of the unit. It is desired that the pressure in the evaporator be as low as possible so that the working temperature will be reduced. Similarly, the pressure in the absorber should be high to improve the efficiency in that unit. The blower 19, which is used to circulate the inert gas, develops a small head of pressure and by locating the blower between the evaporator and absorber, the pressure head developed by the blower will not increase the pressure in the evaporator unit and thereby the working temperature can be maintained at a minimum.

A screen of wire mesh 20 or other perforated material is disposed at an angle across the upper portion of the evaporator 12 and serves to entrain any material such as liquid refrigerant droplets that may be carried upwardly with the stream of the inert gas. By disposing the screen at an angle with respect to the axis of the evaporator, an increased surface area for the screen is provided.

The lean or pure absorbent in the fractionator is introduced into the upper portion of the absorber unit 11 through line 21 and flows downwardly within the absorber in counter current flow with the inert gas and the refrigerant vapor. The absorbent absorbs the refrigerant vapor and enriched absorbent is discharged from the lower portion of the absorber unit through line 22. The absorber itself is of conventional construction and consists of a series of trays and downcomers which provide the necessary contact between the absorbent and the refrigerant vapor.

The inert gas being withdrawn from the absorber through line 16 contains some absorbent and refrigerant as contaminant and thus there is a tendency for a small portion of the absorbent to accumulate in the refrigerant liquid at the bottom of the evaporator. In order to prevent the accumulation of absorbent, the liquid refrigerant is recirculated back to the fractionator 1 through line 14 and pure refrigerant liquid from the fractionator is introduced into the evaporator 12 through line 23.

It has been found that the presence of the inert gas in the absorber unit lessens the capacity of the pure absorbent entering through line 21 to absorb the refrigerant vapors and thus an increased flow rate of absorbent is necessary in order to dissolve a given amount of refrigerant vapor if the inert gas is present. As the efficiency of the absorption-refrigeration cycle operating at a fixed temperature level is largely a function of absorbent circulation rate, the system incorporates a series of absorber-exchanger units 3 and 4 as described in the copending applicaiton Serial No. 72,955, filed December 1, 1960 of the same inventor. The absorber-exchanger units serve to cool the pure absorbent before the same enters the absorber to thereby increase the amount of refrigerant that can be absorbed in the absorbent so that a more efficient system is obtained.

The pure absorbent being withdrawn from the fractionator through line 10 initially passes through a heat exchanger 24 in heat conductive relation to the enriched absorbent in line 5 to thereby cool the pure absorbent and heat the enriched absorbent. After passing through the heat exchanger 24, the pure absorbent may pass through a second heat exchanger 25 where additional heat is lost to a fluid being circulated within lines 26. After leaving the heat exchanger 25, the pure absorbent in line 10 is then introduced into the absorber-exchanger 3 where the pure absorbent is passed in heat conductive relation with the pure refrigerant liquid which is introduced into the upper portion of the unit 3 through line 9.

As shown in the flow sheet, the absorber-exchanger unit 3 is composed of a tube bundle 27 at the bottom of the tower connected to line 10 and through which the pure absorbent flows. The pure refrigerant liquid boils around the tube bundle 27, thereby cooling the absorbent in the tubes at a temperature dependent upon the total pressure of the tower. There is no inert gas present in the absorber-exchanger units. The vapor from the boiling refrigerant rises up the tower where it encounters the partially enriched absorbent liquid which is introduced into the upper end of the unit through line 28. The refrigerant vapor is absorbed in the partially enriched absorbent to further enrich the same, and the enriched absorbent is collected from the bottom tray of the absorber-exchanger 3 and pumped through line 5 by pump 29 to the fractionator 1.

The pure absorbent which has been cooled within the absorber-exchanger 3 is then conducted through line 30 to the second absorber-exchanger 4 where it again passes in heat conductive relation with the pure refrigerant liquid which is introduced into the absorber-exchanger 4 from absorber-exchanger 3 through line 31. The unit 4 is substantially similar in construction to unit 3 and the pure absorbent flows through the tube bundle 32 and the pure refrigerant boils around the tubes, thereby further cooling the absorbent and vaporizing the refrigerant which rises up the tower into contact with the partially enriched absorbent introduced into the upper end of the unit 4 through line 22. As the unit 4 contains no inert gas, the absorbent is capable of absorbing increased quantities of the refrigerant vapor to further enrich the absorbent, and the further enriched absorbent is conducted in line 28 to the upper end of the absorber-exchanger unit 3. Pump 33 is located in the line 28 to circulate the partially enriched absorbent therein.

The pure refrigerant liquid is withdrawn from the unit 4 through line 23 and is introduced into the evaporator unit 12.

With this system, as the partially enriched absorbent liquid leaves the absorber 11 through line 22, it moves toward the fractionator 1 through successive absorber-exchangers and becomes further enriched in refrigerant at each step due to the fact that the absorber-exchangers do not contain inert gas and due to the result of increasing pressures. This also results in increasing the temperature of the enriched absorbent at each step.

The pure separated absorbent leaving the fractionator is fed progressively through each absorber-exchanger unit toward the cold end and at each successive step its temperature is lowered until it emerges at a low temperature level to be introduced into the absorber section 11 of the cold absorber-evaporator 2. Similarly, the pure refrigerant moving from the fractionator 1 to the cold end of the absorber-evaporator 2 has its temperature progressively lowered.

By further enriching the partially enriched absorbent in the absorber-exchanger units and by lowering the temperature of the pure absorbent passing to the absorber, a substantially increased efficiency is obtained for the absorption-refrigeration system. In this system, the inert gas is confined to the absorber-evaporator unit 2 which permits the attainment of minimum temperatures. However, the inert gas is not present in the absorber-exchanger units 3 and 4 so that the partially enriched absorbent operating at higher effective absorption pressures can absorb increased amounts of the refrigerant vapor. The presence of inert gas lowers the capacity of the absorbent to absorb refrigerant vapor by 5 to 20 times or more and thus, by eliminating the inert gas from the absorber-exchanger units, substantially greater quantities of refrigerant vapor can be absorbed in the absorbent.

The present invention provides an increased efficiency for an absorption unit due to the improved evaporator-absorber design. According to the invention, the inert gas is circulated through a conduit from the upper portion of the evaporator to the lower portion of the absorber and the blower is located in the conduit and serves to circulate the inert gas through the closed system. By positioning the blower between the evaporator and the absorber, a minimum pressure is maintained in the evaporator which thereby serves to maintain the working temperature in the evaporator at a minimum.

A heat exchange unit, such as a tube bundle, which serves to conduct the outside medium to be cooled, is introduced into the lower end of the evaporator into heat exchange relation with the cold refrigerant liquid therein. As the refrigerant liquid is being vaporized within the evaporator, the latent heat of vaporization is also employed to cool the outside medium.

Various modes of carrying out the invention are contemplated as being within the scope of the following claims particularly pointing out and distinctly claiming the subject matter regarded as the invention.

I claim:

1. In an absorption-refrigeration system,
    (a) a casing with the upper portion of the casing defining an absorber and the lower portion of the casing defining an evaporator,
    (b) means disposed within the casing for closing off the absorber from the evaporator,
    (c) first conduit means interconnecting the upper end of the absorber with the lower portion of the evaporator,
    (d) second conduit means located on the exterior of the casing and connecting the upper end of the evaporator with the lower end of the absorber, said absorber, first conduit means, evaporator and second conduit means comprising a closed system with said closed system containing an inert gas,
    (e) means located within said second conduit means for circulating the inert gas through the system and for circulating refrigerant vapor from the evaporator to the absorber, said last named means developing a small pressure head which adds to the pressure in the absorber to improve the efficiency of the absorbing operation while maintaining the pressure in the evaporator at a minimum level to thereby maintain a minimum working temperature,
    (f) third conduit means for introducing liquid refrigerant to the evaporator, and
    (g) a perforated member disposed within the upper portion of the evaporator beneath the connection of the second conduit means with the evaporator and above the connection of the third conduit means with the evaporator for preventing entrained particles of liquid refrigerant from passing within said second conduit means.

2. In an absorption-refrigeration system,
    (a) an absorber,
    (b) first conduit means for introducing substantially pure liquid absorbent into the upper end of the absorber,
    (c) second conduit means for conducting enriched absorbent from the lower end of the absorber,
    (d) an evaporator,
    (e) third conduit means for introducing the refrigerant liquid to the evaporator,
    (f) fourth conduit means interconnecting the upper end of the absorber with the lower portion of the evaporator,
    (g) fifth conduit means connecting the upper end of the evaporator with the lower end of the absorber, said absorber, four conduit means, evaporator and fifth conduit means comprising a closed system with said closed system containing an inert gas,
    (h) means located within the fifth conduit means for circulating the inert gas through the system and for circulating refrigerant vapor from the evaporator to the absorber, and
    (i) a perforated member disposed within the upper portion of the evaporator beneath the connection of the fifth conduit means with the evaporator and above the connection of said third conduit means with the evaporator for collecting entrained particles of liquid refrigerant contained within the refrigerant vapor.

References Cited in the file of this patent
UNITED STATES PATENTS

| | | |
|---|---|---|
| 2,023,969 | Nesselman | Dec. 10, 1935 |
| 2,178,561 | Coons | Nov. 7, 1939 |
| 2,178,603 | Nelson | Nov. 7, 1939 |
| 2,204,226 | Nelson | June 11, 1940 |
| 2,650,480 | Gilmore | Sept. 1, 1953 |
| 2,667,764 | Turner | Feb. 2, 1954 |